Feb. 8, 1938. H. J. HAMMERLY Re. 20,649

THERMOSTATIC OVERLOAD SWITCH

Original Filed Dec. 24, 1934 2 Sheets-Sheet 1

INVENTOR
HERMAN J. HAMMERLY,
BY
ATTORNEY

Feb. 8, 1938. H. J. HAMMERLY Re. 20,649

THERMOSTATIC OVERLOAD SWITCH

Original Filed Dec. 24, 1934 2 Sheets-Sheet 2

INVENTOR
HERMAN J. HAMMERLY,
BY
ATTORNEY

Reissued Feb. 8, 1938 Re. 20,649

UNITED STATES PATENT OFFICE 20,649

THERMOSTATIC OVERLOAD SWITCH

Herman J. Hammerly, New Britain, Conn., assignor to The Trumbull Electric Manufacturing Company, Plainville, Conn., a corporation of Connecticut Original No. 2,038,105, dated April 21, 1936, Serial No. 758,913, December 24, 1934. Application for reissue November 2, 1937, Serial No. 172,467

21 Claims. (Cl. 200—116)

My invention relates particularly to electric switches adapted to be normally manually actuated but which will automatically open the circuit in case of an overload.

One object is to provide an extremely simple and practical construction of the snap action toggle type which is automatically released by the action of a thermostatic strip to open the circuit in case of an overload. The switch is normally actuated to off and on positions by the simple tilting of a finger lever. A bimetallic thermostatic strip in the form of a latch holds the parts when they are moved to the closed circuit position. A removable and renewable heater unit coacts with the thermostatic strip to release the toggle action in case of an overload. The switch may then be reset manually as soon as the thermostatic strip cools off.

The exact form of embodiment is not vital to the invention.

Figure 1:
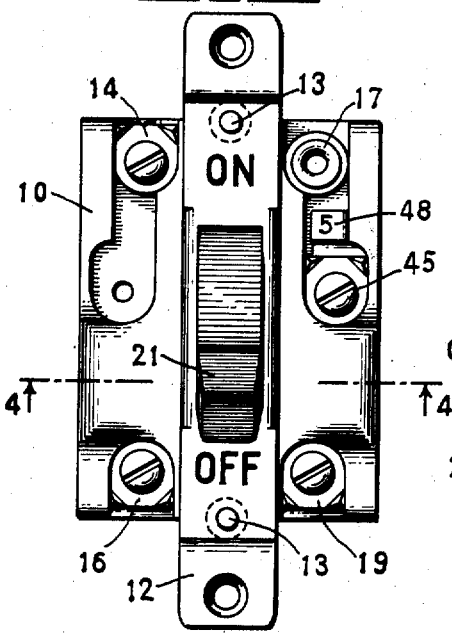
Fig. 1 shows a front view of one form of construction embodying my invention.
Figure 2:
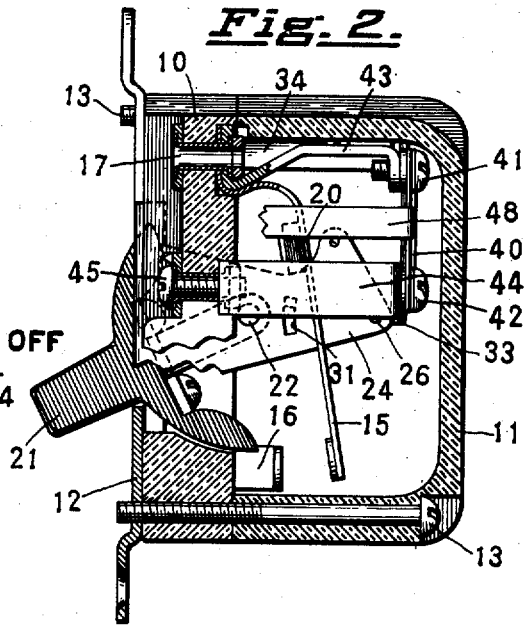
Fig. 2 shows a vertical section and side elevation with the parts in the off or open circuit position.
Figure 3:
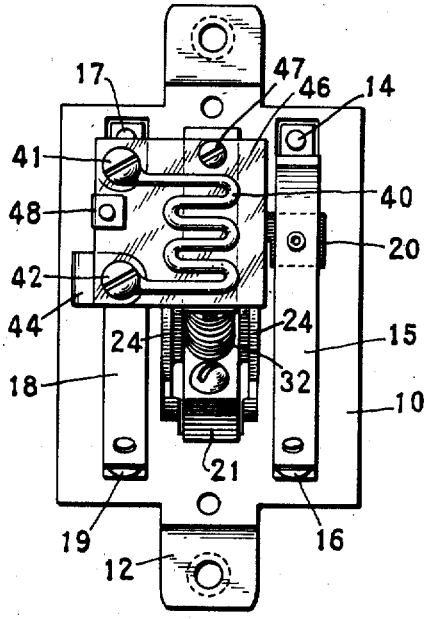
Fig. 3 is a rear view.
Figure 4:
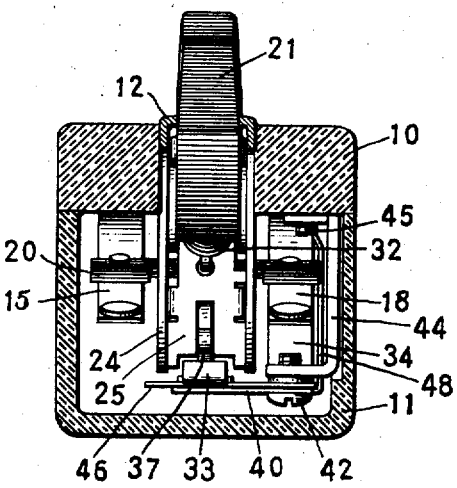
Fig. 4 is a transverse sectional view on the plane of the line 4—4 of Fig. 1.

The switch shown is of the enclosed snap action type. The housing is made up of the base or front section 10 and the box like portion 11 both formed of insulating material and held together by a number of screws 13 which screw into the face plate 12. The binding post or terminal 14 is electrically connected to the spring switch arm 15, the movable end of which coacts with the stationary contact 16.

The terminal 17 is electrically connected to the spring switch arm 18, the movable end of which is adapted to engage the stationary contact 19.

These two arms 15 and 18 are mechanically connected by an insulating cross bar 20.

The operating lever 21 carries a metal U-shaped member with hinge pins 22 which are pivotally supported in the bearing openings 23 in the side arms 24 of the bracket or frame of which the front plate 12 is a part.

The toggle link 25 has hinge members 26 pivoted in the openings 27 in the inner ends of the arms 24. The end 28 of the toggle member 25 has a hinge-like connection in the end of the slotted bar 29 which loosely slides in the handle 21 in the usual manner. The swinging movement of the lever 25 is limited by the projection 30 which extends into the slot 31 in one of the arms 24 of the frame. The spring 32 is mounted on the slotted bar 29 and presses against the washer 29' so as to snap the lever 25 back and forth as the finger piece 21 is actuated.

The bimetallic thermostatic latch member 33 is supported by the post 34. The flipper member 35 is hinged in the lugs 36 which form a part of the toggle member 25. One end 37 of the member 35 is adapted to coact with the hook of the latch 33 and act as a catch and the other end 38 coacts with the cross bar 20 of the movable switch member to act like a cam to force the switch member to a closed circuit or on position. The cross piece 39 serves as an abutment or stop for the finger part 38 of the member 35.

Figure 5:
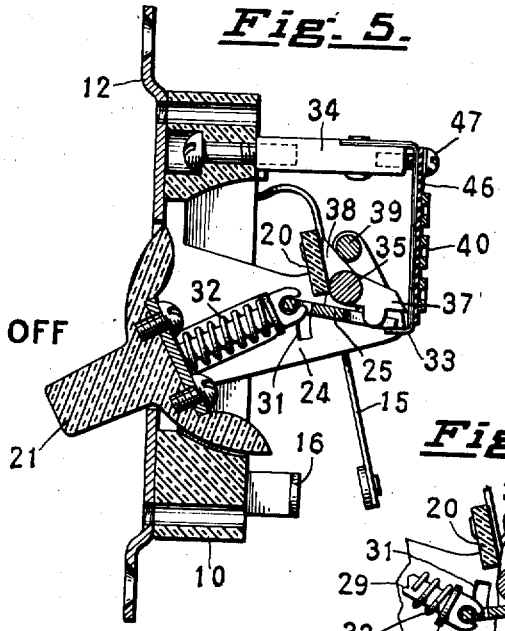
Fig. 5 is a vertical sectional view on a somewhat different plane from that of Fig. 2 but also showing the parts in the open circuit or off position and omitting the box part of the housing.

The action of the switch under normal load conditions is very much the same as that of a conventional type toggle switch. In other words, when the switch is off or in the open circuit position of Fig. 5 the circuit may be closed by simply lifting the finger piece 21 sufficiently so that the cross piece 28 of the toggle link 25 comes below the center line whereupon the toggle action closes the circuit. The opening of the circuit is effected by moving the finger piece 21 in the reverse direction whereupon the snap action of the toggle takes place aided by the spring action of the arms 15 and 18.

The resistance or heater unit 40 may be formed from a flat stamping or flattened wire formed into a coil or zigzag shape and secured in place by screws 41 and 42. The screw 41 is threaded into one end of the bracket 43 which is connected to the terminal 17. The screw 42 is threaded into the bracket 44 which has the circuit terminal 45 at the front. The plate 46 of mica or other suitable insulating material is interposed between the heater or resistance unit and the thermostatic latch 33.

A screw 47 may be provided for adjusting the position or action of the latch 33. An indicator strip 48 has one end supported by the plate 46 and the other end extended through the base 10 and exposed at the front with a mark indicating the rating of the capacity of the switch.

Figure 6:
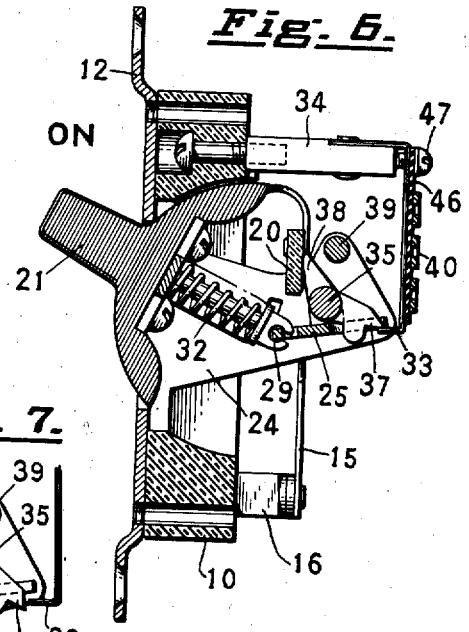
Fig. 6 is a similar sectional view showing the parts in the on or closed circuit position.

When the switch is in the closed circuit position as shown in Fig. 6 the latch 33 engages the beveled tip 37 of the catch member and is held there by the spring pressure or bias of the arms 15 and 18 through the cross bar 20 which presses upon the tail 38 of the catch and tends to rotate the catch member clockwise as viewed in Fig. 6.

Figure 7:
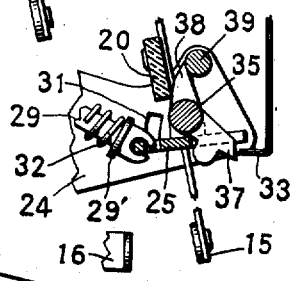
Fig. 7 is a fragmentary view showing the parts in the position which they occupy when released thermostatically.
Figure 8:
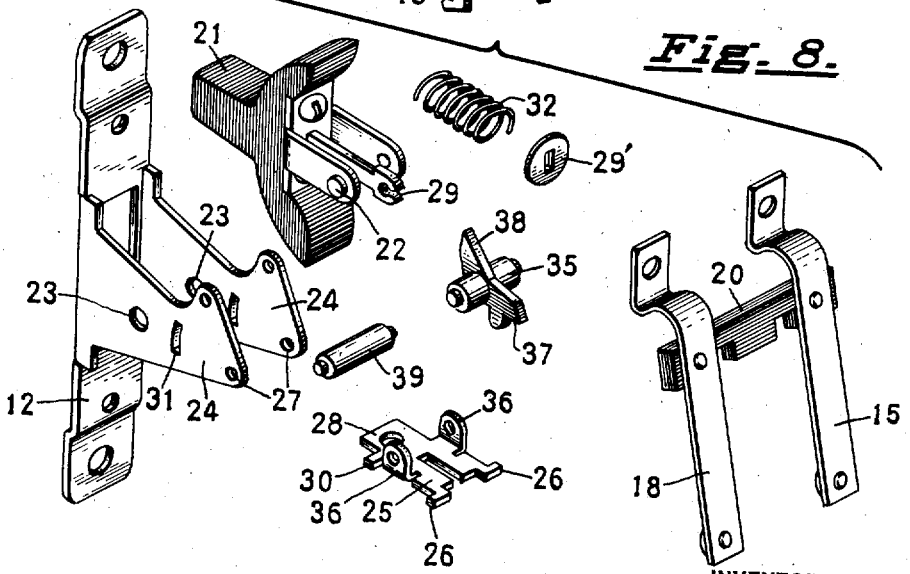
Fig. 8 is an exploded perspective view showing parts of the switch mechanism.

When the thermostatic latch member is heated by an overload current it warps or bends so that its hook-like tip will be disengaged from the tip 37 of the catch and thus allow the spring arms 15 and 18 to tilt the catch with a snap action away from the latch member into the position shown in Fig. 7, thus opening the circuit without affecting the toggle action. To reset the switch it is merely necessary to tilt the finger piece 21 from the position of Fig. 6 to the position of Fig. 5 which throws the catch back into the position shown in Fig. 5.

From the foregoing it will be seen that the switch may be actuated manually under normal circumstances in the same manner as any toggle action switch. It will also be seen that under overload conditions the heater unit will cause the thermostatic latch to warp and release the flipper or catch which in turn allows the movable switch members to open the circuit with a snap action even though the operating handle is held in the on position. The catch or flipper has no spring of its own but its movement is caused by the action of the spring arms 15 and 18 above described which is not interfered with by the main spring.

One of the important novel features in this present invention is the freely mounted flipper or catch member which requires no spring of its own and functions as a latching or catch member.

It will be further seen that the normal toggle action is wholly independent of the thermostatic action. The resistance heater unit is detachable and can be readily replaced. Obviously the same mechanism may be employed for different capacities by the simple expedient of properly designing the thermostatic latch and the heater unit.

I claim:

1. In a toggle action thermostatic switch, an insulating support, a metal frame carried thereby and having a toggle action device, a freely pivoted catch carried by one part of the toggle action device and a thermostatic latch coacting with the catch.

2. In a toggle action switch, a spring switch member, a toggle action device including a catch carried by one part of the device and coacting with the spring switch member and a thermostatic latch coacting with said catch.

3. In a toggle action thermostatic switch, a metallic frame, a toggle member hinged at one end of the frame, a finger piece hinged to the toggle member, a spring for biasing the toggle member, a catch loosely hinged to the toggle member, a spring pressed switch member moved in one direction by the catch and a thermostatic latch coacting with said catch to permit the normal opening and closing of the switch but adapted to release the catch and spring pressed switch member in case of an overload.

4. In a thermostatic switch, a toggle action device, a freely pivoted catch carried by one part of the toggle action device and a thermostatic latch coacting with the catch and a spring pressed switch member coacting with said catch.

5. In a toggle action switch, a spring switch arm, a toggle action device including a catch pivoted to one part of the device and coacting with the spring switch arm and a resilient thermostatic latch coacting with said catch.

6. In a toggle action thermostatic switch, a metallic frame, a toggle member hinged at one end to the frame, a finger piece connected to the toggle member, a spring for biasing the toggle member, a catch hinged to the toggle member, a spring pressed switch member moved in one direction by the catch and a resilient thermostatic latch coacting with said catch and adapted to release the catch and spring pressed switch member in case of an overload.

7. An electric switch including a pivoted operating lever, a pivoted toggle member hinged to the operating lever, a catch member hinged to the toggle member, a spring pressed switch member coacting with the catch member and a thermostatic latch normally interposed in the path of the catch member.

8. A snap switch including a stationary contact, a movable switch member for coacting therewith and normally biased to the off position, operating mechanism coacting with the movable switch member and including a finger lever, an oscillating member connected to the finger lever, means pivotally carried by the oscillating member and free to move on occasion of an overload, a thermal element holding said means under normal circuit conditions and a throwing spring coacting with the oscillating member for actuating the same so as to open and close the circuit with a snap action when said finger lever is manually operated and so as to permit opening the circuit with a snap action when the thermal element releases said means.

9. In a snap switch, an insulating support having a passage extending from front to rear of said support, a stationary contact and a cooperating movable contact carried by said support, said movable contact being biased to an open circuit position, a thermally actuated element carried by the support, a frame secured to said support and having ears projecting into said passage, a finger lever pivotally carried by said ears, an oscillating member pivotally carried by and restricted in its movement by said ears, a flipper member pivotally carried by said oscillating member and free to move on occurrence of an overload in the circuit, one end of said flipper member being held by said thermally actuated element under normal circuit conditions and adapted to be released by the action of the thermally actuated element upon an overload condition, the other end of said flipper member coacting with the movable contact, so that the movable contact may be moved by the action of the finger lever to open and close the circuit and so that the movable contact will automatically open the circuit upon an overload in the circuit.

10. In a snap switch, a stationary contact, a movable switch element cooperating therewith and normally biased in an off position, an oscillating member, a finger lever connected to the oscillating member, a throwing spring interposed between said finger lever and said oscillating member, a flipper member mounted on said oscillating member and coacting with the movable switch element to operate the same when the finger lever is manually operated to open and close the circuit, and a thermally actuated member holding said flipper member under normal load circuit conditions and adapted to release said flipper member on an overload condition, said spring actuating the oscillating member when the action of the finger lever starts the oscillating member and said biased movable switch element opening the circuit and moving the flipper member when the thermally actuated member releases the flipper member.

11. A snap switch construction of the manual and automatic overload type, including a stationary contact, a movable contact cooperating therewith and normally biased to the open circuit position, an operating unit including a finger lever, an oscillating member connected thereto, a combined cam and catch member pivotally mounted on and carried by said oscillating member and serving to hold the movable contact in the closed circuit position and free to move on occurrence of an overload in the circuit, a thermally actuated element holding said combined cam and catch member under normal circuit conditions and adapted to be released upon an overload condition and a throwing spring interposed between said finger lever and said oscillating member for opening said switch with a snap action during normal circuit conditions and said biased movable contact opening the switch with a snap action on an overload condition.

12. A snap switch having stationary contacts, a movable contact cooperating therewith, actuating mechanism including an operating handle member, an oscillating member and a throwing spring connecting the last two said members, means responsive to an overload in the circuit, controlling means for the movable contact carried by said oscillating member and acting as a unit with said oscillating member when latched to the overload-responsive means and becoming inoperative upon occurrence of an overload, said actuating mechanism being constructed to reset the controlling means by manually moving said operating handle to the off position.

13. In a snap switch, an operating member, an oscillating member and a spring member, said oscillating member being movable with a snap action from open to closed switch position under the influence of the spring governed by said operating member, a movable contact arm biased by its own resilience to the open circuit position, a thermostatic latch member, a flipper member carried by said oscillating member adapted when engaged by said thermostatic latch to cause said movable contact arm to be under control of said operating member and when said thermostatic latch is disengaged from said flipper member said movable contact is released from control of said operating member.

14. In a thermostatic switch, an oscillating member carrying a pivoted flipper member, movable switch members biased to open circuit position, a thermostatic latch normally engaging said flipper member, said flipper member adapted to hold said movable switch members in closed position when said oscillating member is in closed position and said flipper member is engaged by said thermostatic latch, and said flipper member being adapted to release said movable switch members when said oscillating member moves to the open position or said flipper member is released by the thermostatic latch.

15. In an overload protective switch, a movable switch member biased to open circuit position, an over-center spring device including a flipper carried by one part of the device and having a catch portion coacting with the movable switch member and an overload latch coacting with said catch portion and adapted when released upon predetermined conditions to permit movement of the movable switch member and manually operable means for re-engaging said catch portion and said overload latch when the over-center spring device is moved to open circuit position.

16. In an overload protective switch an operating member and an oscillating member, an over-center spring connecting said operating member to said oscillating member, a flipper member carried by said oscillating member and movable therewith, a thermostatic latch engaging said flipper member to cause its movement to be dependent upon the movement of said oscillating member and releasing said flipper member to permit it to move independently of said oscillating member, a movable contact biased to move to the open circuit position, said contact being under control of said flipper member while the flipper member is engaged by the thermostatic latch but free to move to the open circuit position when said flipper member is released by the thermostatic latch.

17. In a snap switch, two pairs of line terminals, a pair of stationary contacts connected to two of said terminals, flat spring switch members, each having one of its ends connected to one of the other terminals and having its free end biased away from contact with one of the stationary contacts, a cross bar connecting the spring switch members, a pivoted operating handle, a pivoted toggle link, an over-the-center spring operably connected with said operating handle and said toggle link and a cam member carried by said toggle link, said handle, spring and toggle member being operable to force said cam into engagement with said cross bar to force said spring switch members into the on position with a snap action when the handle is moved to the on position and to move the cam away so as to allow the spring switch members to snap into the off position through their own resiliency when the handle is moved to the off position.

18. In a snap switch, a pair of line terminals, a stationary contact connected to one of said terminals, a resiliently movable switch member having one of its ends connected to the other terminal and having a free end normally biased away from electrical contact with said stationary contact, a pivoted operating handle, a pivoted toggle link connected to said handle, an over-the-center spring having operable connection with said handle and said toggle link, a cam member carried by said toggle link and insulating means between said switch member and said cam, the said handle and said spring being adapted to move the toggle link so that the cam member will force the resilient switch member into the on position with a snap action when the handle is moved into the on position and so that the cam member will be moved away to allow the switch member to snap into the off position by its own resiliency when the handle is moved into the off position.

19. In an automatic trip switch, a stationary contact, a movable contact, a member for controlling movement of the movable contact, a pivoted lever, said controlling member being supported by said lever but movable relative thereto, a releasable support for said controlling member, said lever, controlling member, and contact thereby being movable in unison to produce selectively a normal closed and normal open position of the switch when said releasable support is in supporting position, and current responsive means for causing movement of the releasable support to withdraw said support from said controlling member, and resilient means for moving said movable contact and controlling member independently of said lever to open the switch when said releasable support is released.

20. In an automatic trip switch, a stationary contact, a movable contact constantly biased toward open position, a member for controlling movement of the movable contact, a pivoted lever, said controlling member being pivotally supported by said lever, a releasable support for said controlling member, said lever, controlling member, and contact thereby being movable in unison to produce selectively normal closed and normal open positions of the switch when said releasable support is in supporting position, and current responsive means for causing movement of the releasable support to withdraw said support from said controlling member, said biased movable contact and controlling member moving independently of said lever to open the switch when said releasable support is released.

21. In an automatic trip switch, a stationary contact, a movable contact, resilient means biasing said movable contact constantly toward open position, a member for controlling movement of the movable contact bearing on said contact, a pivoted lever, said controlling member being pivoted to said lever and movable relative thereto, a releasable support for said controlling member, means for moving said lever, said lever, controlling member, and contact thereby being movable in unison to produce selectively a normal closed and normal open position of the switch when said releasable support is in supporting position, and current responsive means for causing movement of the releasable support to withdraw said support from said controlling member, said resilient biasing means thereupon moving said movable contact and pivotally moving said controlling member independently of said lever to open the switch when said releasable support is released.

HERMAN J. HAMMERLY.